(12) United States Patent
Arsovski

(10) Patent No.: US 9,224,091 B2
(45) Date of Patent: Dec. 29, 2015

(54) LEARNING ARTIFICIAL NEURAL NETWORK USING TERNARY CONTENT ADDRESSABLE MEMORY (TCAM)

(71) Applicant: INTERNATIONAL BUSINESS MACHINES CORPORATION, Armonk, NY (US)

(72) Inventor: Igor Arsovski, Williston, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 137 days.

(21) Appl. No.: 14/202,590

(22) Filed: Mar. 10, 2014

(65) Prior Publication Data

US 2015/0254553 A1 Sep. 10, 2015

(51) Int. Cl.
- *G06N 5/02* (2006.01)
- *G06N 3/08* (2006.01)
- *G06N 3/063* (2006.01)

(52) U.S. Cl.
CPC .................. *G06N 3/08* (2013.01); *G06N 3/063* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 7,606,968 B2 | 10/2009 | Branscome et al. | |
| 7,675,765 B2 | 3/2010 | Derharcobian et al. | |
| 8,195,873 B2 | 6/2012 | Gazit | |
| 2006/0176721 A1 | 8/2006 | Kim et al. | |
| 2010/0082895 A1 | 4/2010 | Branscome et al. | |

OTHER PUBLICATIONS

Junsangsri, et al., A Memristor-based TCAM (Ternary Content Addressable Memory) Cell: Design and Evaluation, GLSVLSI'12, May 3-4, 2012, pp. 311-314.*
IPCOM000181621D; "Distributed Ternary CAM";An IP.com Prior Art Database Technical Disclosure; http://ip.com/IPCOM/000181621D; Nokia Siemens Networks., Apr. 7, 2009. 4 pages.

* cited by examiner

*Primary Examiner* — Wilbert L Starks
(74) *Attorney, Agent, or Firm* — Michael Le Strange; Andrew M. Calderon; Roberts Mlotkowski Safran & Cole, P.C.

(57) ABSTRACT

A circuit is provided for that includes one or more TCAM arrays including one or more matchlines configured to model a neural network. Each of the one or more TCAM arrays models a connected group of neurons such that input search data into the one or more matchlines is modeled as neuron dendrite information, and the output from the one or more matchlines is modeled as neuron axon information. The circuit further includes one or more additional bits included within each of the one or more matchlines that are configured to model connectivity strength between each neuron dendrite and axon. The circuit also includes a real-time learning block included within each of the one or more TCAM arrays configured to modify the connectivity strength between each neuron dendrite and axon using wild-cards written and stored in the one or more additional bits.

20 Claims, 10 Drawing Sheets

| Neuron | CONNECTIONS (up to the TCAM width) | CONNECTION STRENGTH | | | |
|---|---|---|---|---|---|
| 1 | 8,.... | X | X | X | X |
| 2 | 1,.... | | | | |
| 3 | 2,5,.... | | | | |
| 4 | 3,.... | | | | |

| Neuron | CONNECTIONS (up to the TCAM width) | CONNECTION STRENGTH | | | |
|---|---|---|---|---|---|
| 5 | 0,.... | X | X | X | X |
| 6 | 5,.... | | | | |
| 7 | 6,... | | | | |
| 8 | 7,.... | | | | | ately searched within a single clock cycle. CAM typically
LEARNING ARTIFICIAL NEURAL NETWORK USING TERNARY CONTENT ADDRESSABLE MEMORY (TCAM)

FIELD OF THE INVENTION

The invention relates generally to artificial neural networks, and more particularly, relates to implementing a learning artificial neural network using ternary content addressable memory (TCAM).

BACKGROUND

Content addressable memory (CAM) is a hardware module that either acts as a separate integrated circuit module or is embedded in another integrated circuit such as computer processing unit (CPU). More specifically, CAM is an application specific memory that allows its entire contents to be typically searched within a single clock cycle. CAM typically compares input search data against a table of stored data, and returns the address of the matching data. CAMs having a single clock cycle throughput make them faster than other hardware and software based search systems. Therefore, CAMs can be used in a wide variety of applications requiring high search speeds (e.g., image coding, parametric curve extraction, and Lempel-Ziv compression). The primary commercial application of CAMs today is to classify and forward Internet protocol (IP) packets in network routers.

There are two basic forms of CAM, the binary CAM (BCAM) and ternary CAM (TCAM). Binary CAMs support storage and searching of binary bits, and perform exact-match searches by storing either logic bit "0" or logic bit "1". TCAMs support storing of logic bit "0", logic bit "1", or a don't care logic bit "X". The don't care logic bit acts as a wildcard during searches, and allow TCAM to be attractive for implementing pattern-matching algorithms such as routing table rules (e.g., longest-prefix-match and range-match searches) in adaptive artificial neural networks.

SUMMARY

In a first aspect of the invention, a circuit is provided for that includes one or more TCAM arrays including one or more matchlines configured to model a neural network. Each of the one or more TCAM arrays models a connected group of neurons such that input search data into the one or more matchlines is modeled as neuron dendrite information, and the output from the one or more matchlines is modeled as neuron axon information. The circuit further includes one or more additional bits included within each of the one or more matchlines that are configured to model connectivity strength between each neuron dendrite and axon. The circuit also includes a real-time learning block included within each of the one or more TCAM arrays configured to modify the connectivity strength between each neuron dendrite and axon using wild-cards written and stored in the one or more additional bits.

In another aspect of the invention, a network of TCAM arrays is provided that includes a first TCAM array comprising one or more matchlines configured to model a first sub-neural network. The one or more matchlines model a first connected group of neurons configured to perform at least a first function. The input search data into the one or more matchlines is modeled as neuron dendrite information, and the output from the one or more matchlines is modeled as neuron axon information. The network further includes a second TCAM array comprising one or more matchlines configured to model a second sub-neural network. The one or more matchlines model a second connected group of neurons configured to perform at least a second function. The input search data into the one or more matchlines is modeled as the neuron dendrite information, and the output from the one or more matchlines is modeled as the neuron axon information. Each of the one or more matchlines includes one or more additional bits that are configured to model connectivity strength between each neuron dendrite and axon. At least one of the one or more matchlines of the first TCAM array are configured to receive search data from at least one of the one or more matchlines of the second TCAM array.

In yet another aspect of the invention, a method is provided for that includes defining groups of matchlines with high intra-connectivity designed to perform at least one function. The method further includes assigning each group of matchlines to a TCAM array. The method further includes populating the TCAM array with search data to emulate connectivity both inter-group and intra-group. The method further includes tracking interactivity between the matchlines. The method further includes modifying the search data to accurately emulate connectivity both inter-group and intra-group based on the tracking of the interactivity.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates generally to artificial neural networks, and more particularly, relates to implementing a learning artificial neural network using ternary content addressable memory (TCAM). Generally, TCAMs are used for range matching (e.g., combined inequality functions), and the degenerative operations less-than and greater-than provide for a wide-spread application space. An example of such an application space includes artificial intelligence including adaptive machine learning and pattern recognition. In embodiments, the present invention provides for an artificial neural network of TCAMs (e.g., computational models) inspired by a mammalian central nervous system and configured for adaptive machine learning and pattern learning. More specifically, each TCAM array modeling of the present invention represents a well connected group of neurons where input search data acts as neuron dendrite information, and output match data of an entry(s) acts as neuron axon information. Advantageously, each TCAM may include additional bits in each word to model the connectivity strength between each neuron dendrite and axon, and each TCAM may include a real-time learning block to modify the strength of the dendrite-axon connection using the additional bits such that embodiments of the present invention are configured for machine learning and pattern learning.

Figure 1:
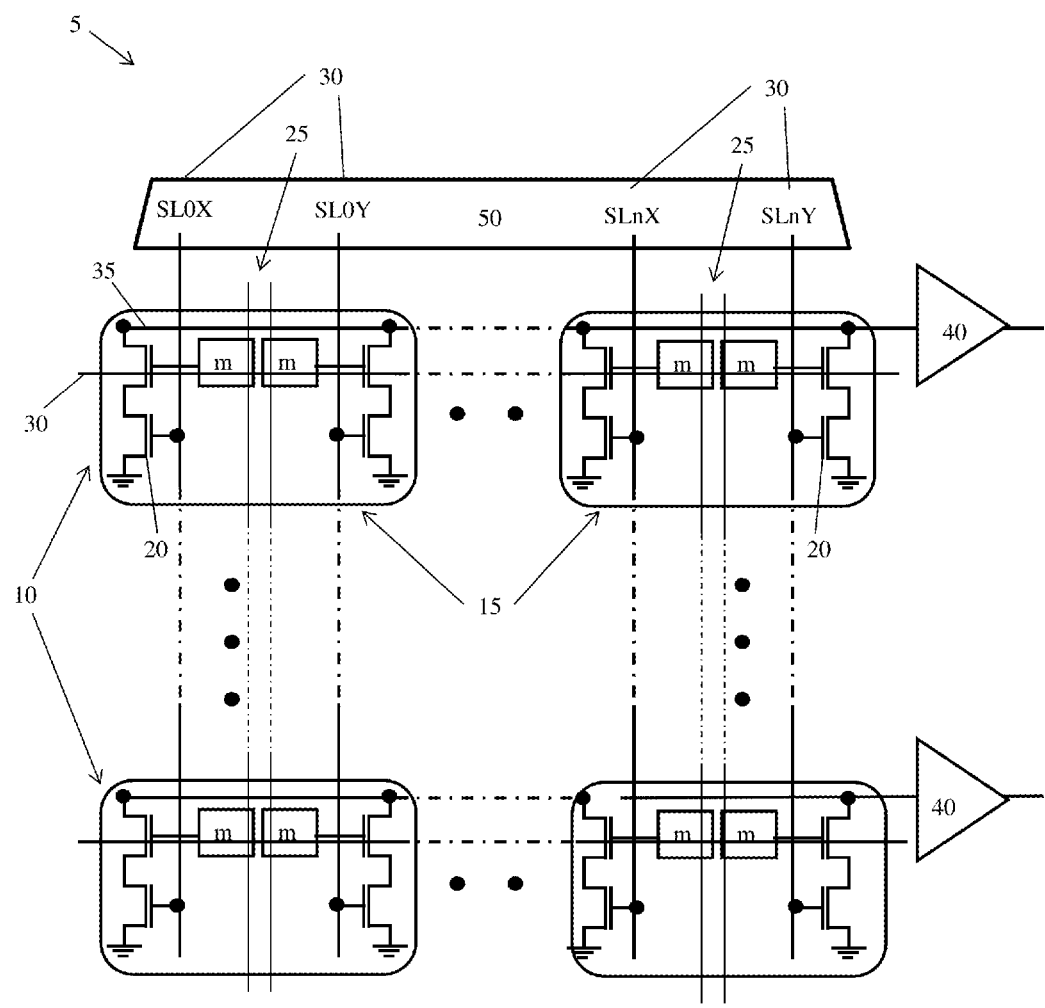
FIG. 1 shows a generic use of a standard TCAM to implement range-matching in accordance with aspects of the invention.

FIG. 1 shows a TCAM 5 having any number of horizontal words 10 (e.g., words 1-x) comprising any number of bits (e.g., bits 1-n) implemented using TCAM cells 15. The TCAM cells 15 comprise transistors 20 (e.g., storage and search data comparison circuitry). Left and right bitlines 25 and word lines 30 may be used to program the TCAM cells 15. Search lines 30 run vertically though the TCAM cells 15 and broadcast the search data to the TCAM cells 15. Matchlines 35 run horizontally though the TCAM cells 15 and indicate whether the search data matches the cell's logic bit, e.g., "0", "1", "X". An activated matchline indicates a match and a deactivated matchline indicates a non-match or a mismatch. The matchlines 35 may be configured as an input to sense amps 40 that sense the signal from the matchlines 35 and output signals as usable data (e.g., search data) for subsequent TCAMs.

In embodiments, a TCAM search operation may begin with precharging all matchlines 35 high, and thus putting them all temporarily in the match state. Next, the search line drivers 50 broadcast the search data onto the search lines. Then each TCAM cell 15 compares its stored bit against the bit on its corresponding search lines 30. TCAM cells 15 with matching data do not affect the matchlines 35 but TCAM cells 15 with a mismatch pull down the matchlines 35. TCAM cells storing a don't care logic bit "X" operate as if a match has occurred. The aggregate result is that matchlines 35 are pulled down for any word that has at least one mismatch. All other matchlines 35 remain activated (precharged high). However, it should be understood by those of ordinary skill in the art that other matchline sensing schemes may be used in accordance with aspects of the present invention without departing from the spirit and scope of the present invention. For example, in alternative or additional embodiments, other matchline sensing schemes may be applied where the matchlines are pre-charged to a miss to determine a match from a miss.

Figure 2:
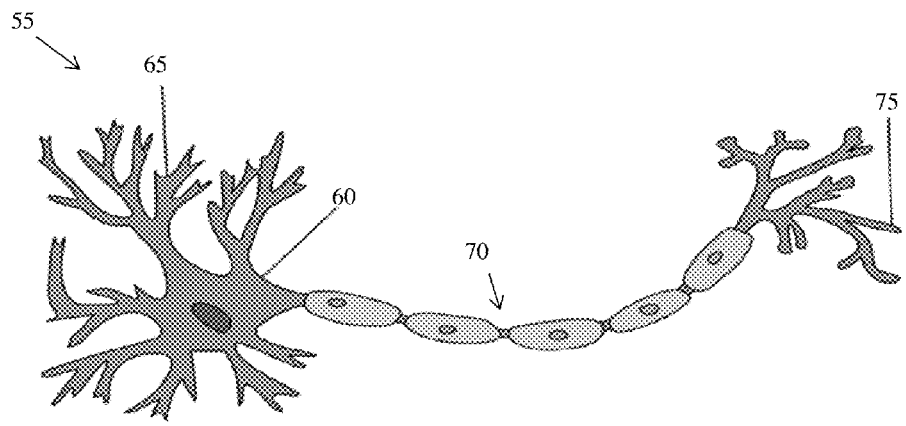
FIG. 2 is shows a neuron in accordance with aspects of the invention.

In embodiments, the present invention provides for an artificial neural network of TCAMs as described with respect to FIG. 1 inspired by a mammalian central nervous system and configured for adaptive machine learning and pattern learning. In an artificial neural network, artificial nodes called "neurons", "neurodes", "processing elements" or "units", are connected together to form a network which mimics a biological neural network. As shown in FIG. 2, a neuron 55, also known as a neurone or nerve cell, is an electrically excitable cell that processes and transmits information by electrical and chemical signaling. Chemical signaling occurs via synapses, specialized connections with other cells. Neurons connect to each other to form neural networks.

A typical neuron 55 possesses a cell body 60, dendrites 65, and an axon 70. Dendrites 65 are thin structures that arise from the cell body 60, often extending for hundreds of micrometres and branching multiple times, giving rise to a complex "dendritic tree". An axon 70 is a special cellular extension that arises from the cell body 60 at a site called the axon hillock and travels for a distance, as far as 1 m in humans or even more in other species. The cell body 60 of a neuron 55 frequently gives rise to multiple dendrites 65, but never to more than one axon 70, although the axon 70 may branch hundreds of times before it terminates at an axon terminal 75. At the majority of synapses, signals are sent from the axon 70 of one neuron 55 to a dendrite 65 of another.

The chemical synapses between the neurons allow the neurons to form circuits within the central nervous system, which are crucial to the biological computations that underlie perception and thought. The strength of a synapse is defined by the amplitude of the change in membrane potential as a result of a presynaptic action potential. A "synapse" usually refers to a group of connections (or individual synapses) from the presynaptic neuron to the postsynaptic neuron. The strength of a synapse can be accounted for by the number and size of each of the connections from the presynaptic neuron to the postsynaptic neuron. The amplitude of postsynaptic potentials (PSPs) can be as low as 0.4 mV to as high as 20 mV. The amplitude of a PSP can be modulated by neuromodulators or can change as a result of previous activity. Changes in synaptic strength can be short-term, lasting seconds to minutes, or long-term (long-term potentiation, or LTP), lasting hours. Learning and memory are believed to result from long-term changes in synaptic strength, via a mechanism known as synaptic plasticity.

Synaptic plasticity is a change in synaptic transmission affected by previous activity. These changes may result in either a decrease in the efficacy of the synapse, called depression, or an increase in efficacy, called potentiation. These changes can either be long-term or short-term. Forms of short-term plasticity include synaptic fatigue or depression and synaptic augmentation. Forms of long-term plasticity include long-term depression and long-term potentiation. Synaptic plasticity can be either homosynaptic (occurring at a single synapse) or heterosynaptic (occurring at multiple synapses).

Figure 3:
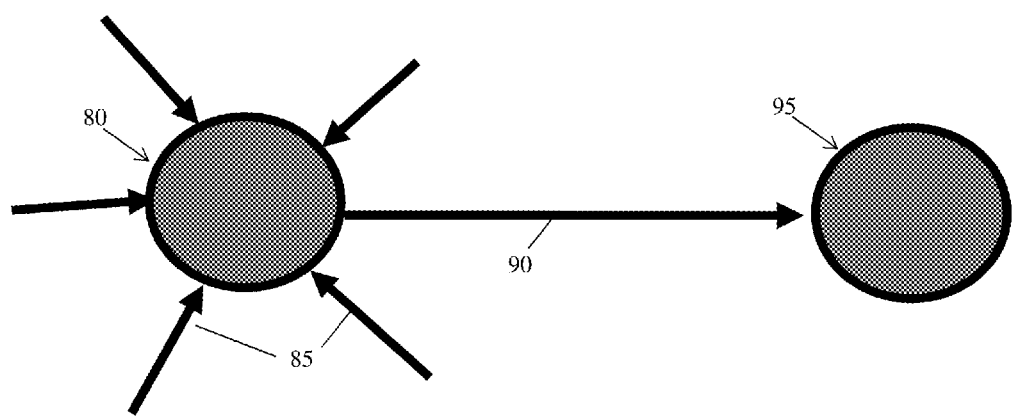
FIG. 3 is a simplified representation of a neuron showing inputs and outputs for mapping into a TCAM implemented neural network in accordance with aspects of the invention.

The neural network and synaptic plasticity described herein provide inspiration for embodiments of the present invention in which TCAMs are configured to process data as part of an artificial neural network similar to that of the neurons in the mammalian nervous system. For example, FIG. 3 shows a matchline or word line 80 (e.g., cell body) from one TCAM that may be configured to receive search data from another matchline on the same TCAM or other TCAMs 85 via wired connections (e.g., receive data from other cells via synaptic connections), determine match data as discussed with respect to FIG. 1, and output the match data 90 to another matchline on the same TCAM, other TCAMs 85, or completely different TCAMs 95 as a function of the input data and a strength of the connection between the matchline 80 and the another matchline on the same TCAM or other TCAMS 85. Advantageously, each matchline may be rewritten to modify the strength (e.g., increase or decrease the strength) of the dendrite-axon connection (e.g., potentiation or depression) such that embodiments of the present invention are configured for machine learning and pattern learning.

Figure 4:
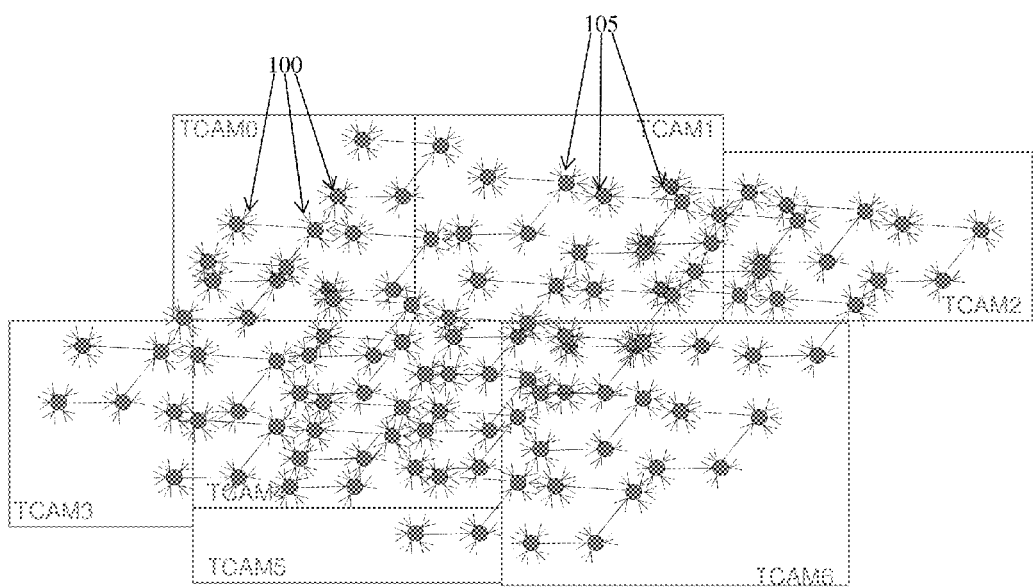
FIGS. 4-7 are schematic diagrams of a TCAM network mapping neurons to TCAM entries in accordance with aspects of the invention.

As shown in FIG. 4, the TCAMS of the present invention may be set up into an artificial neural network by dividing a total number of neurons (e.g., matchlines) and their connections into smaller groups, and assigning those groups to TCAM devices. The grouping of the neurons may be performed based on functions required from each group similar to how different brain regions function according to different groups of neurons divided amongst the brain regions. In embodiments, the grouping of the neurons may also be based on decisions to maximize connectivity between neurons within a same TCAM and minimize connections to neurons external of the TCAM. For example, as shown in FIG. 4, neurons or matchlines 100 may be grouped together in TCAM0 because they have connections to one another (e.g., increased interconnectivity), whereas neurons or matchlines 105 may be grouped together in TCAM1 because that have connections to one another and minimal connectivity to the neurons or matchlines 100 in TCAM0. Advantageously, the minimization of the interconnectivity between the groups of neurons may be used to reduce wiring congestion between the TCAMs.

Figure 5:
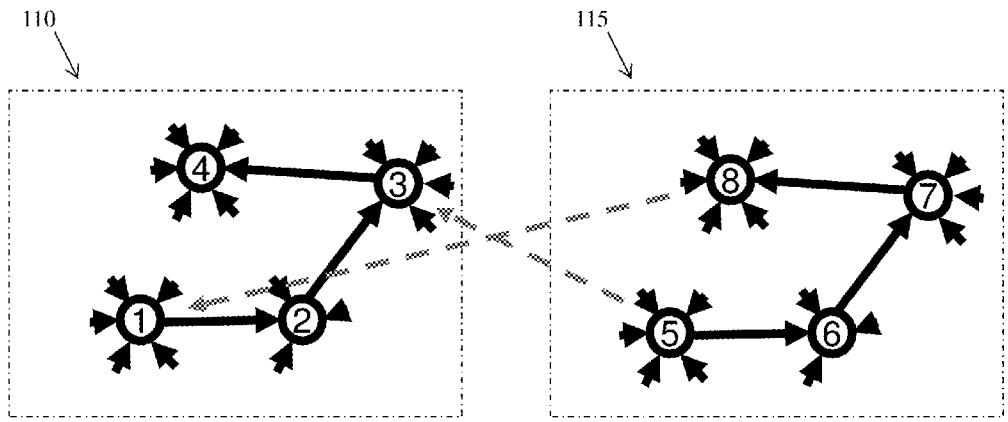
Figure 5:
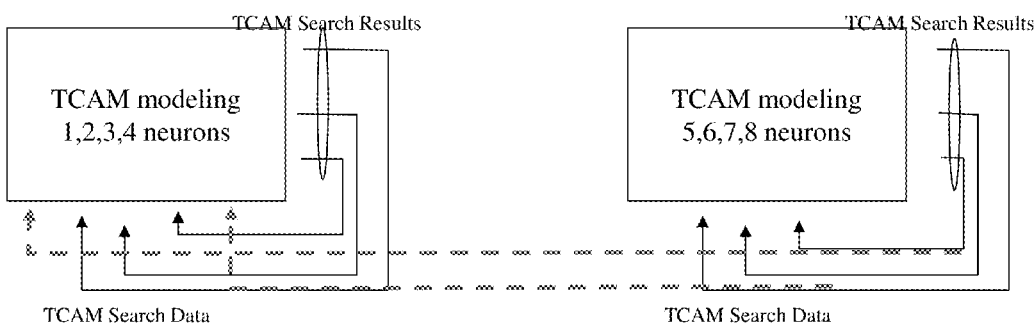

As further shown in FIG. 5, each TCAM 110 and 115 may be configured to implement groups of neurons with large interconnectivity while minimizing interconnectivity between the TCAMs 110 and 115. As should be understood, each neuron or matchline 1-8 is configured to receive search data from other neurons or matchlines (e.g., matchline 1 on TCAM 110 receives search data from matchline 8 on TCAM 115; and matchline 3 on TCAM 110 receives search data from matchline 2 on TCAM 110 and matchline 5 on TCAM 115). In other words, the search lines of each TCAM may be thought of as a dendrite and the matchline output as the axon and, therefore, the physical connections between dendrites and axons is emulated through stored data for the matchlines 1-8 to effectively create wiring between the output of one matchline or neuron and the input of another matchline or neuron. In embodiments, the data stored in each matchline would effectively create a programmable X-bar configured to model dendrite to axon connections. In additional or alternative embodiments, the data stored in each matchline could be read or written and, thus, variable strength of connections may also be written into the TCAM to accommodate learning, as discussed in detail herein.

Figure 6:
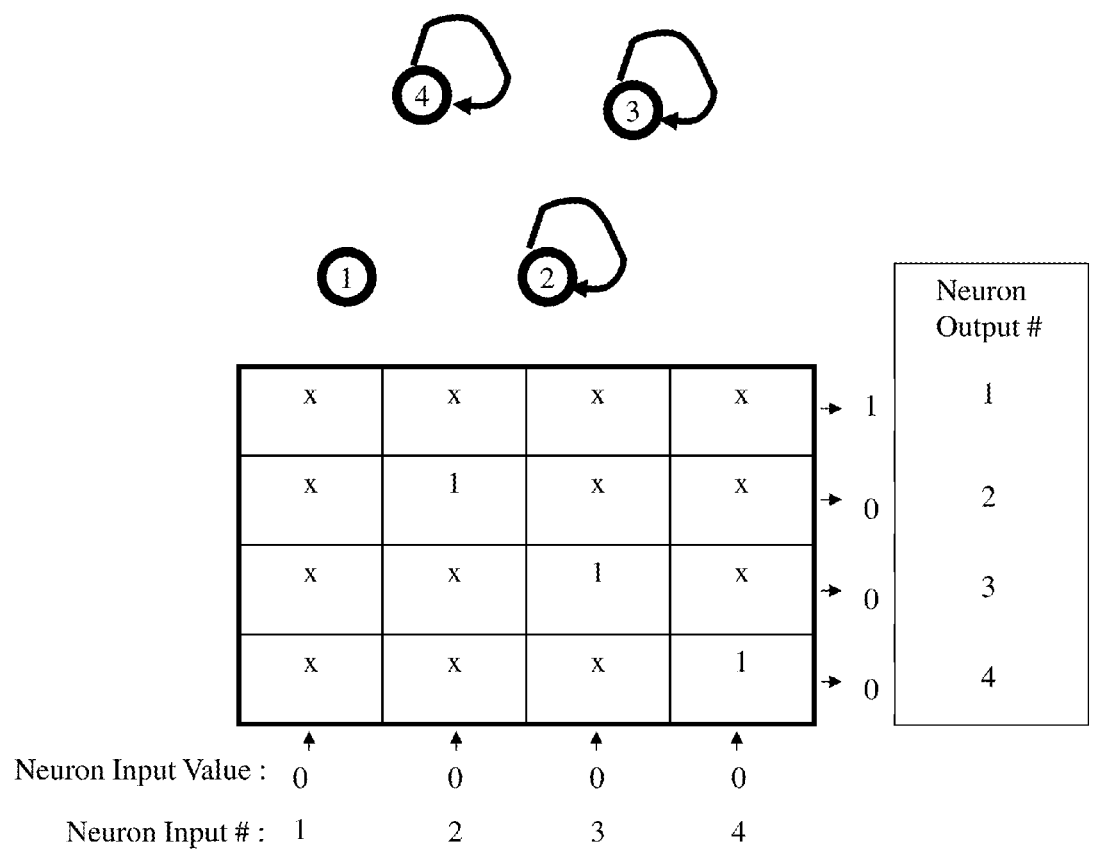

FIG. 6 shows a simple structure used to explain the mapping of neurons or matchlines. In this mapping embodiment to implement the OR function, the neuron outputs are implemented with a miss (0) rather than a TCAM match (1). This allows the implementation of multiple input connections to a single neuron (e.g., one TCAM entry per neuron). For example, the neuron or matchline 1 is not mapped to any other neuron or matchline and, thus, any input into matchline 1 causes a match (1) or an output of (1), which is a non-fire or dormant state for the matchline 1. The neuron or matchlines 2, 3, and 4 are mapped to themselves and, thus, any input into matchlines 2, 3, 4 that causes a mismatch or miss (0) causes an output of (0), which is a fire or active state for the matchlines 2, 3, and 4.

Figure 7:
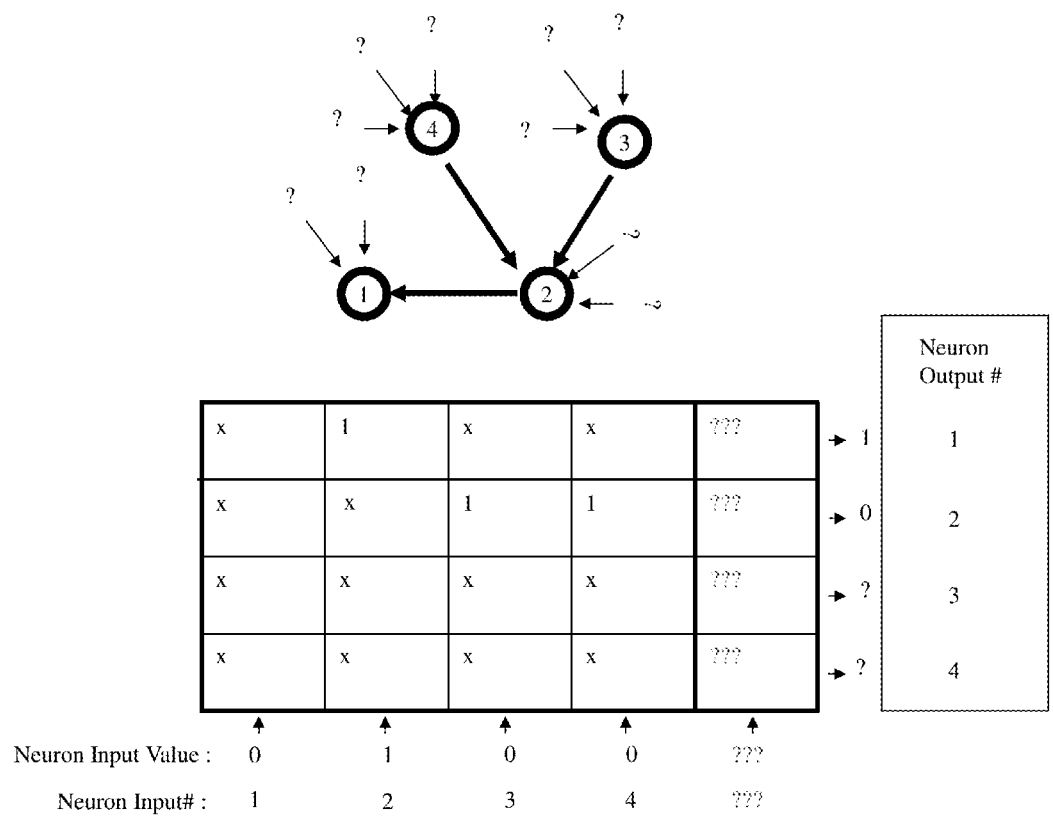

FIG. 7 shows a more complex mapping of neurons or matchlines. In this mapping embodiment to implement the OR function, the neuron outputs are implemented with a miss (0) rather than a TCAM match (1). This allows the implementation of multiple input connections to a single neuron (e.g., one TCAM entry per neuron). The external inputs (e.g., inputs coming from external TCAMs are shown in FIG. 7 as ?s). For example, the neuron or matchline 1 is mapped to receive input data from matchline 2 and external TCAMs ?, but not output any data and, thus, any input into matchline 1 that causes a match (1) or an output of (1) is a non-fire or dormant state for the matchline 1. The neuron or matchline 2 is mapped to receive data from matchlines 3 and 4, and external TCAMs. The neuron or matchline 2 is also mapped to send data to matchline 1 and, thus, any input data into matchline 2 that causes a mismatch or miss (0) causes an output of (0), which is a fire or active state for matchline 2. The neuron or matchlines 3 and 4 are mapped to receive input data from external TCAMs. The neuron or matchlines 3 and 4 are also mapped to output data to matchline 2 and, thus, any input data into matchlines 3 and 4 that causes a mismatch or miss (0) causes an output of (0), which is a fire or active state for matchlines 3 and 4.

In embodiments, each matchline may be written and rewritten to modify the strength of the dendrite-axon connection (e.g., depression or potentiation) such that embodiments of the present invention are configured for machine learning and pattern learning. For example, to model how likely a neuron or matchline is to fire based on the excitation that it has received (e.g., the strength of connection), the strength can be encoded in one or more additional bits for every connection. The connection strength number that is provided to these bits for matching could be anything from a random-number generator to a number that is a function of the inputs to the neurons.

Figure 8:
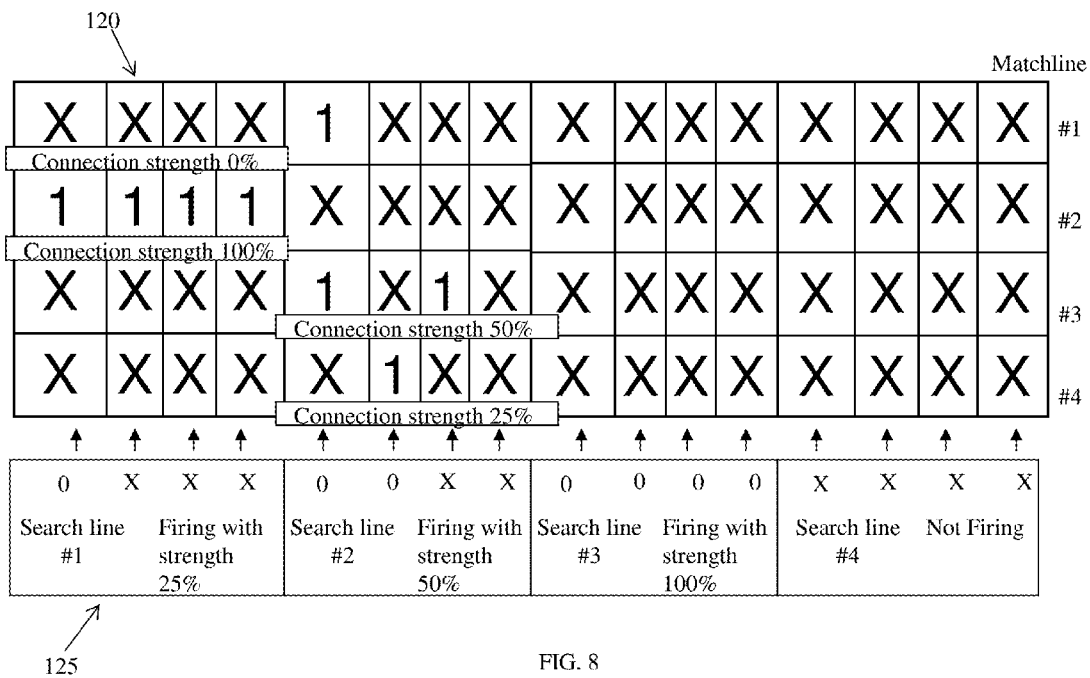
FIG. 8 shows an example of modeling neural connectivity strength in accordance with aspects of the invention.

FIG. 8 shows an example of neural connectivity strength modeling in accordance with aspects of the present invention. In embodiments, each neuron connection may be encoded with one or more additional bits where the more Xs or wildcards stored (e.g., block 120 in matchline 1) and the more Xs or wild-cards searched (e.g., block 125 in search line 1) correlates to a weaker connection or weaker input. For example, encoding the axon connection with a set number of bits (e.g., #_of_bits) allows for $2^{\#\_of\_bits}$ of unique connection strengths. In the example where the axon-dendrite connection is encoded with #_of_bits=4, all "XXXX" storage would represent no connection or 0%, and all "1111" storage would represent a 100% connection that ensures the axon activation (e.g., search line firing) and the subsequent firing of the associated neuron axon (e.g., matchline firing).

Additional, axon-dendrite connection strength may also be achieved by encoding the firing strength of the neuron where strongly firing neurons could be represented with search lines having search data with a large number of non-X or non-wild-card values (e.g., "0000" firing with strength of 100%) and on the opposite side of the spectrum non-firing neurons could be represented with a large number of X or wild-card values (e.g., "XXXX" not firing). In embodiments, the input connection with the search lines could be generated using an algorithm (e.g., a random-number generator or a number generator that uses a function of the inputs to the neurons). For example, a random-number generator or number generator may be configured to receive a data signal (e.g., a binary logic signal from a matchline) and convert the data signal into an encoded number of bits or search data to be searched in a search line for a subsequent matchline. Advantageously, by representing the firing strength of the neuron with a random-number of "X" and "1", this implementation could result in a more natural statistical representation of dendrite-axon connections. In additional or alternative embodiments, the neural strength may be modeled using unused neuron connections to model strength of connection with stored Xs.

Figure 9:
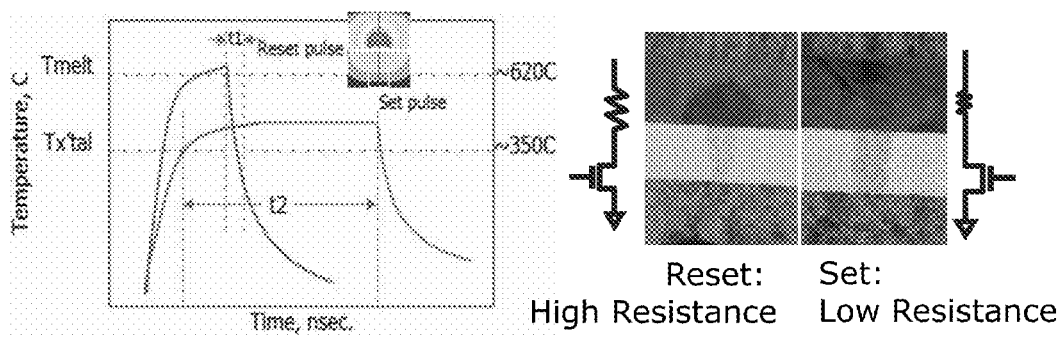
FIG. 9 shows an alternative embodiment for modeling neural connectivity strength in accordance with aspects of the invention.

FIG. 9 shows another example of neural connectivity strength modeling in accordance with alternative aspects of the present invention. In embodiments, phase change memory (PCM) based TCAM along with closest hit matching (rather than exact matching) may be used to model neural connectivity strength. For example, instead of the digital representation of the dendrite-axon connection described in FIG. 8, other memory implementations might include more analog representations. In embodiments, the analog representations of strength can be achieved with variable PCM write pulse duration. Although the present invention is not limited to this implementation, a PCM implementation may be configured to allow programmable resistance within the bit-compare stacks to increase or decrease the probability of a neuron firing based on the resistance of the programmed PCM element. In this example, PCM memory elements that are programmed with higher resistance could represent a weak or no-connection, while PCM memory elements that are programmed with low-resistance could represent strong dendrite-axon connections.

Figure 10:
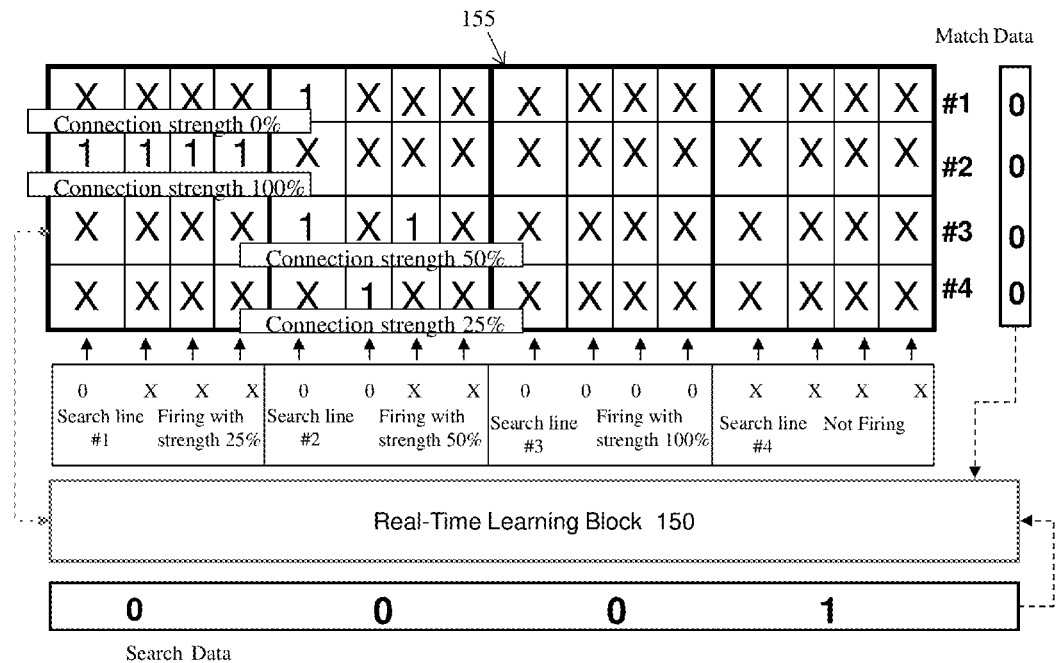
FIG. 10 shows an example of real time learning in accordance with aspects of the invention.

In embodiments, neurons or matchlines that fire together may be wired together (i.e., the strength of connectivity between similar firing neurons or matchlines may be increased or decreased). As shown in FIG. 10, the neuron connectivity strength may be increased or decreased by using an algorithm, such as a dot-product or multiplication between one set of values and another set of values, to simulate real time learning. For example, the real-time learning block 150 may be configured to track which neurons or matchlines fired together (e.g., matchlines 3 and 4) and which neurons or matchlines were stimulated (e.g., matchlines 1 and 2) between each search data and match data such that the neurons or matchlines that fired together would become stronger.

In accordance with these aspects of the present invention, to enable machine learning and/or emulate learning in natural neural networks, neurons or matchlines that fire at the same time could be considered associated with each other, and a stronger connection between them would emulate learning. To allow such behavior, logic structures (e.g., the real-time learning block 150) that correlate search line and matchline TCAM activation can be used to track and modify the strength of connections between the axon (e.g., search lines) and dendrites (e.g., matchlines). In additional or alternative embodiments, since learning can happen at a slow rate, the strength of connection reprogramming could happen in either software and/or hardware.

As further shown in FIG. 10, the real time learning block 150 may be implemented with the TCAM by monitoring activation or depression of the search lines and matchlines, and increasing or decreasing strength on those matchlines. In embodiments, the real time learning block 150 may be counter logic configured to monitor a number of times each matchline fires or lays dormant, and intuitively increase or decrease connectivity strength of the matchlines based on the monitored number of times each matchline fires or lays dormant. In embodiments, the amount of increase or decrease in strength of connection may be achieved by the real time learning block 150 rewriting and storing more or less wildcards in the stored data 155 for the matchline.

Figure 11:
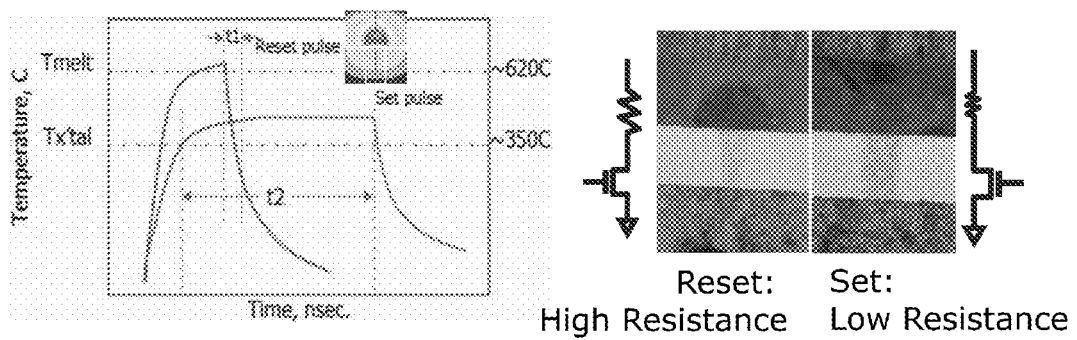
FIG. 11 shows an alternative embodiment for real time learning in accordance with aspects of the invention.

FIG. 11 shows an example of a real time learning block in accordance with alternative aspects of the present invention. In this alternative embodiment, a PCM TCAM cell along with closest hit matching (rather than exact matching) may be used to implement a real time learning block to increase or decrease strength of connectivity between matchlines based on a number of times they are active or dormant together. For example, analog representations of strength can be achieved with variable PCM write pulse duration on the TCAM cell storage and search data comparison circuitry stack, which now uses a PCM storage element. Since the search lines and matchlines cross within the array, the learning sub-blocks can be inserted into the array circuits to increase or decrease the learning cell resistance in an analog fashion. For example, to enable machine learning and/or emulate learning in natural neural networks, neurons that fire at the same time would be considered associated with each other and a stronger connection between them would emulate learning. To allow such behavior, a PCM implementation may be configured to allow programmable resistance within the bit-compare stacks to increase or decrease the probability of a neuron firing based on the resistance of the programmed PCM element. In this example, PCM memory elements that are programmed with higher resistance could represent a weak or no-connection, while PCM memory elements that are programmed with low-resistance could represent strong dendrite-axon connections.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
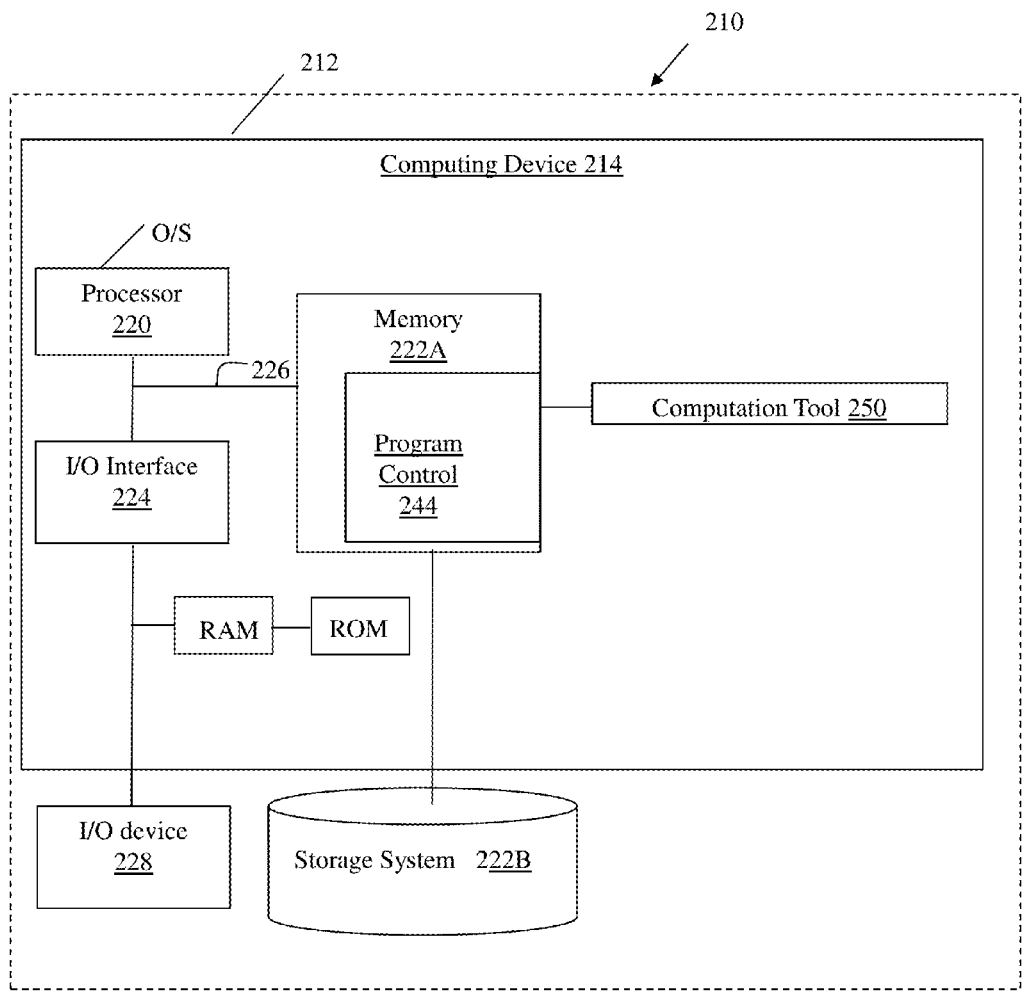
FIG. 12 is an illustrative external environment for implementing the invention in accordance with aspects of the invention.

With reference now to FIG. 12, an illustrative environment 210 is provided for managing the processes in accordance with the present invention. To this extent, the environment 210 includes a server or other computing system 212 that can perform the processes described herein. In particular, the server 212 includes a computing device 214. The computing device 214 can be resident on a network infrastructure or computing device of a third party service provider (any of which is generally represented in FIG. 12).

The computing device 214 also includes a processor 220 (e.g., CPU), memory 222A, an I/O interface 224, and a bus 226. The memory 222A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 214 is in communication with the external I/O device/resource 228 and the storage system 222B. For example, the I/O device 228 can comprise any device that enables an individual to interact with the computing device 214 (e.g., user interface) or any device that enables the computing device 214 to communicate with one or more other computing devices using any type of communications link. The external I/O device/resource 228 may be for example, a handheld device, PDA, handset, keyboard etc.

In general, the processor 220 executes computer program code (e.g., program control 244), which can be stored in the memory 222A and/or storage system 222B. Moreover, in accordance with aspects of the invention, the program control 244 controls a computation tool 250, e.g., at least a portion of an electronic design automation (EDA) application or tool, which performs the processes described herein. The computation tool 250 can be implemented as one or more program code in the program control 244 stored in memory 222A as separate or combined modules. Additionally, the computation tool 250 may be implemented as separate dedicated processors or a single or several processors to provide the function of these tools.

While executing the computer program code, the processor 220 can read and/or write data to/from memory 222A, storage system 222B, and/or I/O interface 224. The program code executes the processes of the invention. The bus 226 provides a communications link between each of the components in the computing device 214.

The computing device 214 can comprise any general purpose computing article of manufacture capable of executing computer program code installed thereon (e.g., a personal computer, server, etc.). However, it is understood that the computing device 214 is only representative of various possible equivalent-computing devices that may perform the processes described herein. To this extent, in embodiments, the functionality provided by the computing device 214 can be implemented by a computing article of manufacture that includes any combination of general and/or specific purpose hardware and/or computer program code. In each embodiment, the program code and hardware can be created using standard programming and engineering techniques, respectively.

Similarly, server 212 is only illustrative of various types of computer infrastructures for implementing the invention. For example, in embodiments, server 212 comprises two or more computing devices (e.g., a server cluster) that communicate over any type of communications link, such as a network, a shared memory, or the like, to perform the process described herein. Further, while performing the processes described herein, one or more computing devices on server 212 can communicate with one or more other computing devices external to server 212 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 13:
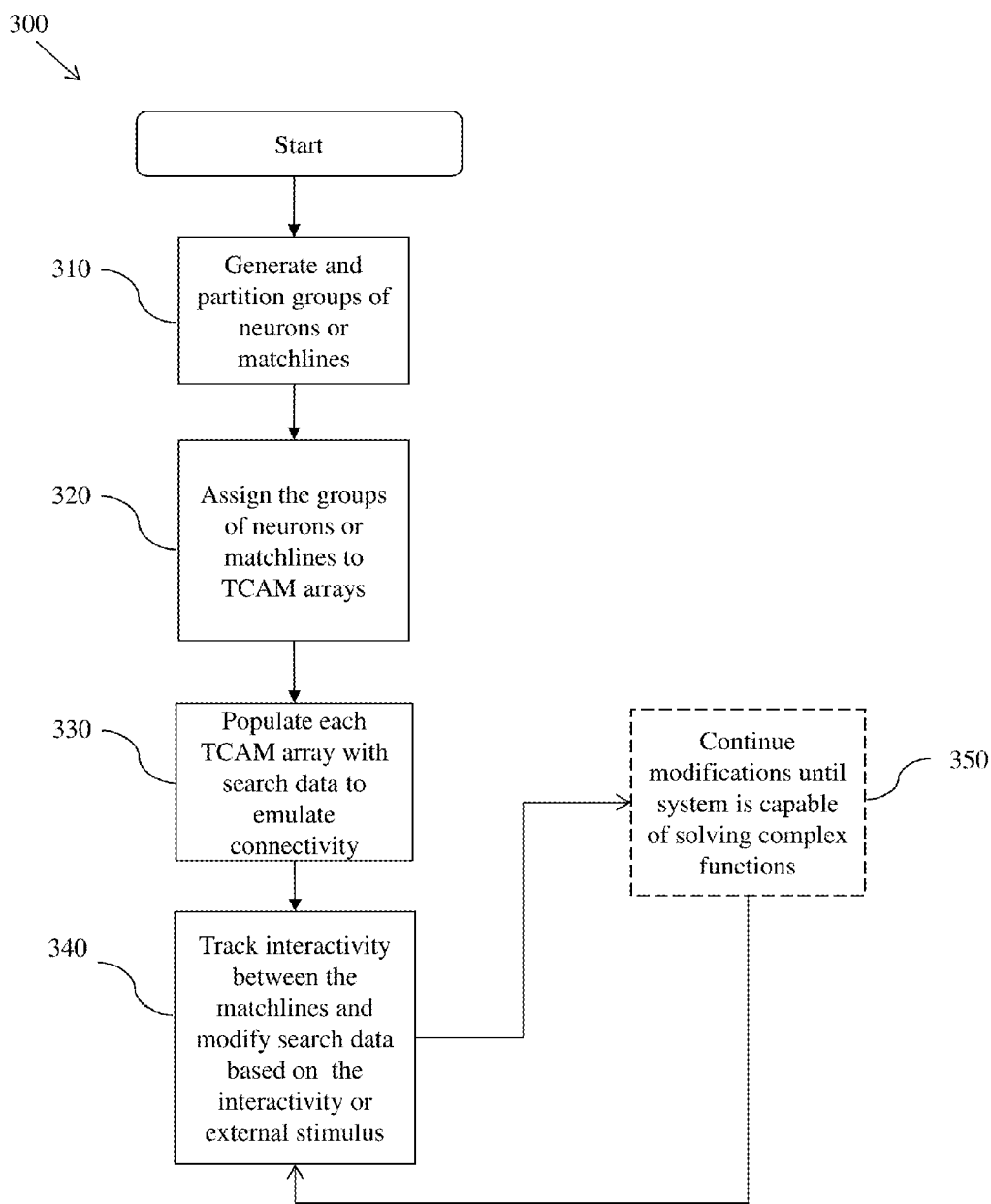
FIG. 13 is an illustrative process flow for implementing the system in accordance with aspects of the invention.

FIG. 13 shows an exemplary flow for performing aspects of the present invention. The steps of FIG. 13 may be implemented in the environment of FIG. 12, for example. As noted above, the flowchart(s) illustrate the architecture, functionality, and operation of possible implementations of systems, methods, and computer program products according to various embodiments of the present invention. In embodiments, a process 300 is provided for implementing a learning neural network using TCAMs.

At step 310, groups of neurons or matchlines with high intra-connectivity designed to perform at least one function may be generated and partitioned into groups of a pre-defined size. In embodiments, the grouping of the neurons or matchlines may be performed based on functions required from each group similar to how different brain regions function according to different groups of neurons divided amongst the brain regions. The grouping of the neurons or matchlines may also be based on decisions to maximize connectivity between neurons within a same TCAM array and minimize connections to neurons external of the TCAM array.

At step 320, each group of neurons or matchlines may be assigned to a TCAM array that is then connected to other TCAM arrays through wirings, e.g., a cross-bar structure, to model a neural network. In accordance with aspects of the invention, each TCAM array may be configured to implement the groups of neurons or matchlines with large intra-connectivity while minimizing interconnectivity between the TCAM arrays. As should be understood, each neuron or matchline in the TCAM arrays is configured to receive search data from other neurons or matchlines within the same TCAM array and/or from the other TCAM arrays (e.g., external TCAM arrays).

At step 330, each TCAM array may be populated with search data to emulate connectivity both inter-group and intra-group. In embodiments, the connectivity between each neuron or matchline may be encoded utilizing a number of bits stored in each matchline. For example, the more Xs stored correlates to a weaker connection or weaker input, as described herein with respect to FIG. 8. Additionally, the connectivity between each neuron or matchline may be further encoded utilizing a number of bits searched in each search line. For example, the more Xs searched correlates to a weaker connection or weaker input, as described herein with respect to FIG. 8. In embodiments, the encoding of the bits searched in each search line may be performed using an algorithm (e.g., a random-number generator or a number generator that uses a function of the inputs to the neurons). For example, a random-number generator or number generator may be configured to receive a data signal (e.g., a binary logic signal from a matchline) and convert the data signal into an encoded number of bits to be searched in a search line for a subsequent matchline.

At step 340, interactivity or external stimulus between the neurons or matchlines may be tracked and used to modify the search data to more accurately emulate connectivity both inter-group and intra-group. In embodiments, the interactivity between the neurons or matchlines may be tracked using a real-time learning block configured to monitor whether the neurons or matchlines are behaving in a certain manner (e.g., firing together), as described herein with respect to FIG. 10.

In embodiments, the neuron or matchline connectivity strength may be increased or decreased by using an algorithm, such as a dot-product or multiplication between one set of values and another set of values, to simulate real time learning reflective of the tracked interactivity between the neurons or matchlines. For example, the real-time learning block may be configured to track which neurons or matchlines fired and which neurons or matchlines were stimulated between each search data and match data such that the neurons or matchlines that fired together would be modified to become stronger, as described herein with respect to FIG. 10. In embodiments, the amount of increase or decrease in strength of connection may be achieved by rewriting or storing more or less wild-cards in the stored data for the neurons or matchlines that are firing together.

At step 350, optionally the interactivity or external stimulus between the neurons or matchlines may be further tracked and used to subsequently further modify the search data to more accurately emulate connectivity both inter-group and intra-group until the learning neural network is capable of solving complex functions (e.g., answering complex questions) or for the life time of the learning neural network to simulate continuous machine learning.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit comprising:
   one or more ternary content addressable memory (TCAM) arrays comprising one or more matchlines configured to model a neural network, wherein each of the one or more TCAM arrays models a connected group of neurons such that input search data into the one or more matchlines is modeled as neuron dendrite information, and output from the one or more matchlines is modeled as neuron axon information;
   one or more additional bits included within each of the one or more matchlines that are configured to model connectivity strength between each neuron dendrite and axon; and
   a real-time learning block included within each of the one or more TCAM arrays configured to modify the connectivity strength between each neuron dendrite and axon using wild-cards written and stored in the one or more additional bits.

2. The circuit of claim 1, wherein the one or more matchlines within the one or more TCAM arrays are intra-connected.

3. The circuit of claim 1, wherein the one or more matchline are grouped into the one or more TCAM arrays based on functions performed by the one or more matchlines and to minimize interconnectivity of the one or more matchlines between the one or more TCAM arrays.

4. The circuit of claim 1, wherein the one or more TCAM arrays further comprise one or more search lines connected to the one or more matchlines.

5. The circuit of claim 4, the circuit further comprising one or more bits included within the search data for each of the one or more search lines that are configured to model firing strength of a neuron or matchline.

6. The circuit of claim 5, wherein the firing strength is modeled based on a number of wild-cards written and stored in the one or more bits included within the search data.

7. The circuit of claim 6, wherein:
the number of wild-cards written and stored in the one or more bits included within the search data is generated using a random-number generator; and
multiple different TCAM searched and stored data encoding schemes are provided by a number of the wild-cards written and stored in the one or more additional bits included within each of the one or more matchlines and the number of wild-cards written and stored in the one or more bits included within the search data to emulate or model the connectivity strength between each neuron dendrite and axon for both depression and potentiation.

8. A network of ternary content addressable memory (TCAM) arrays comprising:
a first TCAM array comprising one or more matchlines configured to model a first sub-neural network, wherein:
the one or more matchlines model a first connected group of neurons configured to perform at least a first function; and
input search data into the one or more matchlines is modeled as neuron dendrite information, and output from the one or more matchlines is modeled as neuron axon information; and
a second TCAM array comprising one or more matchlines configured to model a second sub-neural network, wherein:
the one or more matchlines model a second connected group of neurons configured to perform at least a second function; and
input search data into the one or more matchlines is modeled as the neuron dendrite information, and output from the one or more matchlines is modeled as the neuron axon information, wherein:
each of the one or more matchlines for the first TCAM array and the second TCAM array includes one or more additional bits that are configured to model connectivity strength between each neuron dendrite and axon; and
at least one of the one or more matchlines of the first TCAM array are configured to receive the search data from at least one of the one or more matchlines of the second TCAM array.

9. The network of claim 8, wherein the first TCAM array includes first a real-time learning block configured to modify the connectivity strength between each neuron dendrite and axon of the first TCAM array using wild-cards written and stored in the one or more additional bits.

10. The network of claim 9, wherein the second TCAM array includes a second real-time learning block configured to modify the connectivity strength between each neuron dendrite and axon of the second TCAM array using wild-cards written and stored in the one or more additional bits.

11. The network of claim 8, wherein the one or more matchlines within the first TCAM array are intra-connected and the one more matchlines within the second TCAM array are intra-connected.

12. The network of claim 8, wherein the one or more matchlines are grouped into the first TCAM array and the second TCAM array based on the first function and second function performed, respectively, and to minimize interconnectivity of the one or more matchlines between the first TCAM array and the second TCAM array.

13. The network of claim 8, wherein the first TCAM array and the second TCAM array further comprise one or more search lines connected to the one or more matchlines, and one or more bits are included within the search data for each of the one or more search lines, which are configured to model firing strength of a neuron or matchline.

14. The network of claim 13, wherein the firing strength is modeled based on a number of wild-cards written and stored in the one or more bits included within the search data.

15. The network of claim 14, wherein the number of wild-cards written and stored in the one or more bits included within the search data is generated using a random-number generator.

16. A method comprising:
defining groups of matchlines with high intra-connectivity designed to perform at least one function;
assigning each group of matchlines to a ternary content addressable memory (TCAM) array;
populating the TCAM array with search data to emulate connectivity both inter-group and intra-group;
tracking interactivity between the matchlines; and
modifying the search data to accurately emulate connectivity both inter-group and intra-group based on the tracking of the interactivity.

17. The method of claim 16, wherein the groups of matchlines are a pre-defined size.

18. The method of claim 16, further comprising connecting the TCAM array to other TCAM arrays through wirings.

19. The method of claim 16, wherein the populating the TCAM array with search data comprises encoding one or more additional bits included within each of the matchlines using a number of wild-cards written and stored in the one or more additional bits.

20. The method of claim 16, wherein the populating the TCAM array with search data comprises encoding one or more bits included within the search data using a number of wild-cards written and stored in the one or more bits.

* * * * *